(12) United States Patent
Chesne et al.

(10) Patent No.: US 8,082,874 B2
(45) Date of Patent: Dec. 27, 2011

(54) METHOD FOR MANAGING THE DISPLAY OF A ROTARY COUNTER

(75) Inventors: Philippe Chesne, Vendome (FR);
Brigitte Steiger, Meslay (FR)

(73) Assignee: Thales (FR)

( * ) Notice: Subject to any disclaimer, the term of this patent is extended or adjusted under 35 U.S.C. 154(b) by 322 days.

(21) Appl. No.: 12/306,661

(22) PCT Filed: Jun. 25, 2007

(86) PCT No.: PCT/EP2007/056296
§ 371 (c)(1),
(2), (4) Date: Sep. 11, 2009

(87) PCT Pub. No.: WO2008/000712
PCT Pub. Date: Jan. 3, 2008

(65) Prior Publication Data
US 2010/0012019 A1  Jan. 21, 2010

(30) Foreign Application Priority Data
Jun. 29, 2006 (FR) .................................. 06 05883

(51) Int. Cl.
*G01C 13/00* (2006.01)
*G01D 7/00* (2006.01)
(52) U.S. Cl. ............... 116/304; 116/201; 116/DIG. 34; 340/970

(58) Field of Classification Search .................. 116/200, 116/201, 304, DIG. 15, DIG. 34; 340/970, 340/971, 973, 977; 701/4; 345/467
See application file for complete search history.

(56) References Cited

U.S. PATENT DOCUMENTS

| 4,247,843 | A | 1/1981 | Miller et al. |
| 6,686,851 | B1 | 2/2004 | Gordon et al. |
| 7,205,907 | B2 * | 4/2007 | Naimer et al. ................ 340/978 |
| 7,970,812 | B2 * | 6/2011 | Garside et al. ................ 709/200 |
| 2010/0023187 | A1 * | 1/2010 | Gannon et al. ................... 701/7 |

FOREIGN PATENT DOCUMENTS
DE 1002953 2/1957
JP 59040116 A * 3/1984
* cited by examiner

*Primary Examiner* — R. A. Smith
(74) *Attorney, Agent, or Firm* — Stroock & Stroock & Lavan LLP

(57) ABSTRACT

An embodiment of the invention relates to a method for managing the display of a rotary indicator on a digital screen, the method making it possible to permanently display in a window at least one value of the indicator in the form of characters, the values scrolling vertically in the window, a distance d defining a spacing between two characters of two successive values. The distance d varies between a value $d_{mini}$ when two successive values are visible in the window and a value $d_{maxi}$ when a single value is visible in the window.

6 Claims, 3 Drawing Sheets

METHOD FOR MANAGING THE DISPLAY OF A ROTARY COUNTER

CROSS REFERENCE TO RELATED APPLICATIONS

The present application is the U.S. National Phase of International Patent Application Serial No. PCT/EP2007/056296, filed on Jun. 25, 2007, which claims the benefit of French Patent Application Serial No. 0605883, filed on Jun. 25, 2006, both of which are hereby incorporated by reference in their entireties.

BACKGROUND OF THE INVENTION

The invention relates to a method for managing the display of a rotary indicator. Embodiments of the invention have an advantageous application in aeronautics for the display, on an instrument panel of an aircraft, of the value of the altitude and/or of the speed of the aircraft.

More precisely, most aircraft are equipped with combined instruments generally used as standby and displaying the attitude of the aircraft in a central zone, the speed in a left lateral zone and the altitude in a right lateral zone.

Mechanical indicators have been used for displaying the speed and the altitude in combined standby instruments. Such an indicator makes several juxtaposed wheels rotate about a horizontal axis. Each wheel allows the display of a character which is generally alphanumeric. All of the values that a character can have are printed on each wheel. While rotating, the wheels move vertically in front of a window in order to allow only the current value of the speed or of the altitude to appear. To ensure good legibility of the current value, the height of the window should be sufficient for there always to be one character entirely visible in the window whatever the position of the wheel may be. In order to satisfy this criterion, the height of the window should be at least equal to twice the height of a character plus the height of the spacing between two successive characters.

Digital displays have appeared in combined instruments but, in order not to disturb aircraft pilots, these new displays have retained the same presentation of information as in the mechanical instruments.

The window forms part of the display device of a navigation instrument on which other information is displayed and there is a tendency to reduce the size of the window to allow the display of a greater amount of data on the display device. In order to reduce the size of the window whilst retaining good legibility, it has been attempted to retain the height of the characters and to reduce the spacing between characters. It has also been attempted to reduce the height of the characters whilst retaining the spacing. These two solutions have not been ergonomically satisfactory.

SUMMARY OF THE INVENTION

The purpose of the invention is to overcome the problems mentioned above by proposing a display method which makes it possible to reduce the height of the window of a rotary indicator whilst retaining good legibility of the characters visible in the window.

For this purpose, an embodiment of the invention is a method for managing the display of a rotary indicator making it possible to permanently display in a window at least one value of the indicator in the form of characters, the values scrolling vertically in the window, a distance d defining a spacing between two characters of two successive values, characterized in that the distance d is varied between a value $d_{mini}$ when two successive values are visible in the window and a value $d_{maxi}$ when a single value is visible in the window.

BRIEF DESCRIPTION OF THE DRAWING

Embodiments of the invention will be better understood and other advantages will appear on reading the detailed description of one embodiment given by way of example, this description being illustrated by the appended drawing in which.

For the purpose of clarity, the same items bear the same references in the different figures.

DETAILED DESCRIPTION OF THE PREFERRED EMBODIMENT

Figure 1:
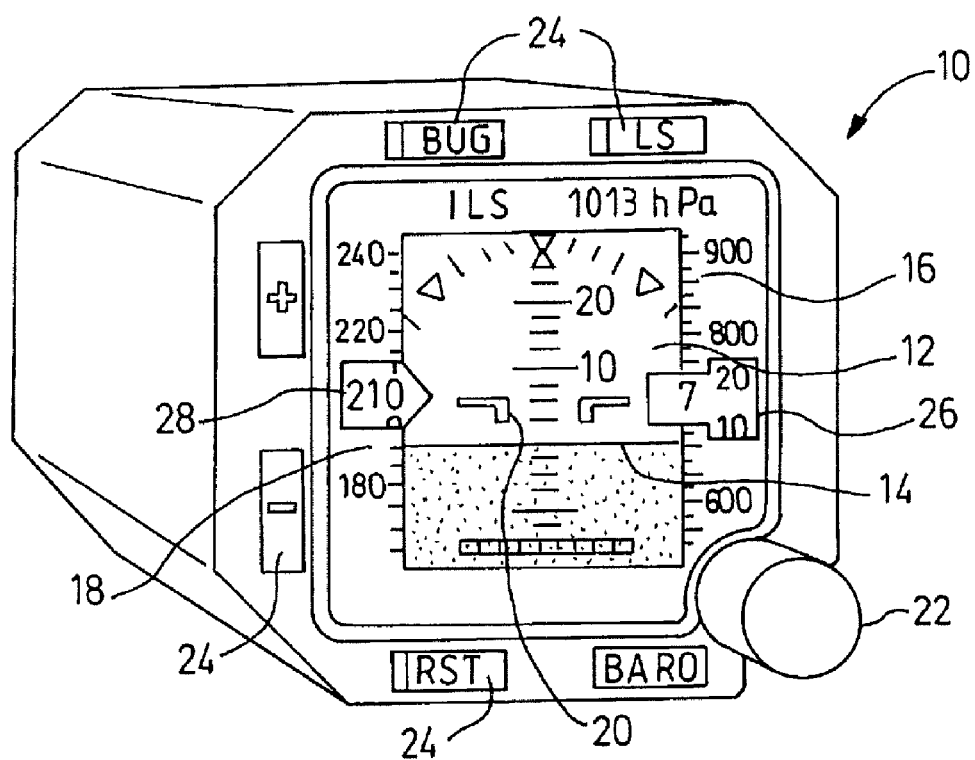
FIG. 1 shows a combined standby instrument.

FIG. 1 shows a combined standby instrument 10 equipping an aircraft. The instrument 10 comprises a color digital screen 12 for the display of a horizon 14 (ground in brown below, sky in blue above) and of standby data necessary for piloting, that is to say principally altitude in the form of a scrolling graduated scale 16 on the right, speed in the form of a scrolling graduated scale 18 on the left and an aircraft attitude symbol 20. The display of the horizon and of the data is produced according to a calculation performed by the instrument 10 on the basis of signals coming from sensors, some of which are outside of the instrument 10 and others of which can be inside or outside of the instrument 10. The sensors are generally pressure sensors (for the speed and the altitude) and an inertial measuring unit for the attitude.

The instrument 10 generally comprises an adjustment knob 22 used for the resetting of the atmospheric pressure according to data communicated locally (for example provided by the meteorological services close to an airport). It comprises other control buttons 24 having various uses (resetting the horizon, positioning speed range or authorized altitude marks on the screen, etc). The instrument comprises installed electronic circuits and software. It provides items of information independent from those which are given by the aircraft's main navigation aid systems.

The scrolling graduated scales 16 and 18 each comprise in a central part of the screen 12 a magnifying lens, 26 and 28 respectively, making it possible to see the current value accurately. By way of example, in FIG. 1, the altitude of the aircraft is 715 feet (equivalent to about 240 m) and its speed is 210 knots (equivalent to about 390 km/h). The magnifying lens 26 displays the hundreds in its left hand part the FIG. 7 in this case, and the tens and the units in its right hand part, a value of between 10 and 20 in this case. On the right hand part of the magnifying lens 26, the displayed characters scroll vertically in a window in the form of an indicator giving discrete values spaced by 10 feet. For the tens and units, the exact value of 15 is therefore situated between the values 10 and 20 of the indicator. The principle of display in the magnifying lens 28 can be similar to that of the magnifying lens 26.

Hereafter, only the ergonomics of the right hand part of the magnifying lens 26 will be considered, but it is of course understood that the invention can be used for any other rotary indicator such as for example that of the magnifying lens 28 showing the speed of the aircraft.

Figure 2A:
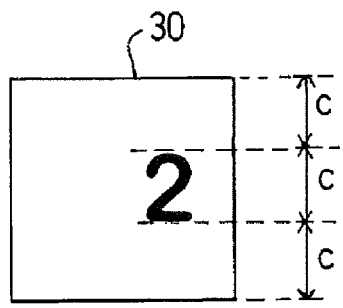
FIGS. 2a and 2b show two display situations for a window of large size
Figure 2B:
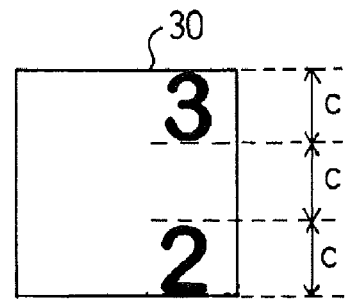

FIGS. 2a and 2b show a same window 30 whose height is equal to three times the height c of a character. The spacing between two successive characters is equal to the height c of a character. When a character is centered in the window 30, as is the case in FIG. 2a, the display is not overloaded, thus ensuring good ergonomics. In the case of FIG. 2b, where an intermediate value between two characters is to be displayed, the height of the window 30 allows the correct display of two complete characters. Here again, the legibility of the characters is correct. In all of the intermediate situations between the two cases of FIGS. 2a and 2b, there will always be at least one character displayed completely. The ratio between the height of the window 30 and the height c of the characters provides good visual comfort but necessitates a window using a lot of space on the screen 12.

Figure 3A:
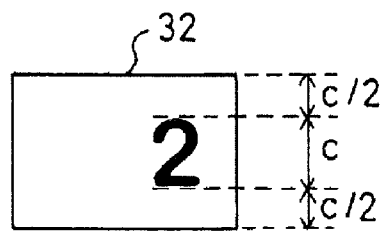
FIGS. 3a and 3b show two display situations for a widow of smaller size.
Figure 3B:
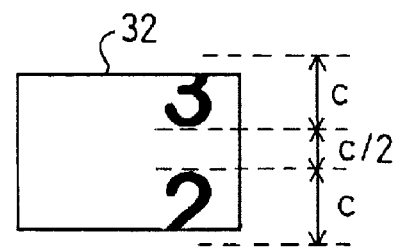

FIGS. 3a and 3b show a window 32 which is not as high as the window 30. The height of the window 32 is equal to twice the height c of a character. The spacing between two successive characters is equal to half of the height c/2 of a character. When a character is centered in the window 32, as is the case in FIG. 3a, the display is as legible as that of FIG. 2a. However, in the case of FIG. 3b, where an intermediate value between two characters has to be displayed, the height of the window 32 does not make it possible to display two characters completely, which can result in problems in the interpretation of the real value.

In order to ensure this legibility it would be necessary for the height of the window 32 to be equal to 2.5 times the height of a character and, more generally, to twice the height of a character plus the height of a spacing between two successive characters. However, in the case of a character c entered in such a window, the preceding and following characters would appear in the window partially which would degrade the ergonomics of the display.

The display situations described with reference to FIGS. 2 and 3 use a constant spacing between characters and do not therefore make it possible to define a smaller window height than that of the window 30 without degrading the display.

Figure 4A:
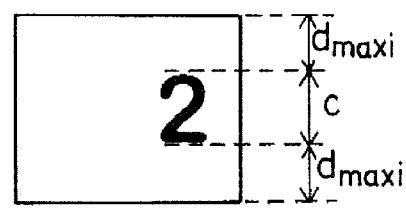
FIGS. 4a and 4b show two display situations for a window where a method according to an embodiment of the invention is used.
Figure 4B:
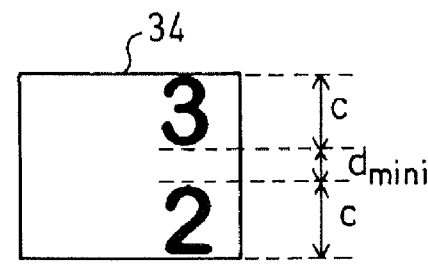

A solution described with reference to FIGS. 4a and 4b makes it possible to improve the ergonomics of the display by proposing to vary the spacing between two successive characters. This variable spacing will be called d. In FIG. 4a a character is centered in a window 34 and the spacing d is maximum and referenced $d_{maxi}$. This makes it possible to display only a single character in the window 34 without a user being disturbed by other parts of characters which can also appear at the top or at the bottom of the window 34. In FIG. 4b the situation is similar to that of FIGS. 2b and 3b and the spacing d has been reduced to a minimal value dead in order to allow the complete display of two characters in the window 34.

Figure 5:
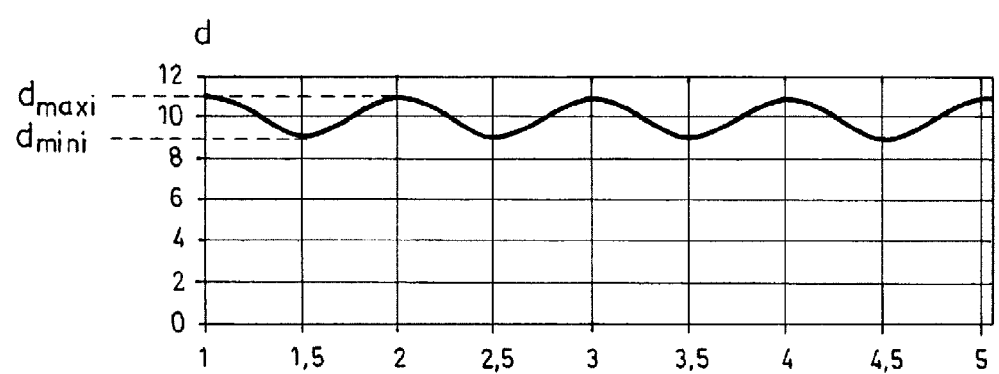
FIG. 5 shows an example of a curve showing the variation of the spacing between characters as a function of the value to be displayed.

FIG. 5 illustrates the variation of the spacing d as a function of a value to be displayed in the window 34. The value to be displayed varies between 1 and 5. The spacing d varies over a graduated scale in an arbitrary manner between 0 and 12. In FIG. 5, the height d varies between 9 and 11 about a value 10. The characters to be displayed in the window 34 are only the integer values between 1 and 5. When the value to be displayed in the window is an integer, only one character should be seen in the window 34. When the value to be displayed in the window is intermediate, at least one complete character should be seen in the window 34. When the value to be displayed is midway between two integer values (1.5; 2.5; 3.5; or 4.5), the spacing is $d_{mini}$ and two characters appear in the window 34.

A height h of the window 34 is defined. Advantageously, in order to see only one character when the value to be displayed in the window is an integer, the distance $d_{mini}$ is defined such that:

$$h=2c+d_{mini}$$

and the distance $d_{maxi}$ is defined such that:

$$h=c+2d_{maxi}$$

In FIG. 5, the distance d is plotted vertically and the value to be displayed is plotted horizontally. The distance d varies sinusoidally between the values $d_{mini}$ and $d_{maxi}$ as a function of the changing value to be displayed. This variation allows very good ergonomics. Other variations are possible, such as a linear variation or a sawtooth variation, between the values $d_{maxi}$ and $d_{mini}$. The linear variation is simpler to implement than the sinusoidal variation.

The instrument 10 comprises a computer making it possible to manage the display on the digital screen 12. This computer can, on the basis of the current value of the indicator to be displayed, easily determine the distance d by, for example, using the function shown in FIG. 5.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method to manage the display of a rotary indicator on a digital screen, to produce a continuous display in a window of at least one value of two successive values of the indicator in the form of characters, the method comprising the following steps:
   scrolling the two successive values vertically in the window, wherein a distance d is formed by a spacing between two characters of the two successive values;
   varying the distance d between a value $d_{mini}$ when the two successive values are visible in the window and a value $d_{maxi}$ when a single value is visible in the window.

2. The method as claimed in claim 1, wherein the distance d varies linearly between the values $d_{mini}$ and $d_{maxi}$ as the value to be displayed changes.

3. The method as claimed in claim 2, wherein the window has a height h and the characters have a height c, and the distance $d_{mini}$ is determined in accordance with the following relationship:

$$d_{mini}=h-2c$$

and the distance $d_{maxi}$ is determined in accordance with the following relationship:

$$d_{maxi}=(h-c)/2.$$

4. The method as claimed in claim 1, wherein the distance d varies sinusoidally between the values $d_{mini}$ and $d_{maxi}$ as the value to be displayed changes.

5. The method as claimed in claim 4, wherein the window has a height h and the characters have a height c, and the distance $d_{mini}$ is determined in accordance with the following relationship:

$$d_{mini} = h - 2c$$

and the distance $d_{maxi}$ is determined in accordance with the following relationship:

$$d_{maxi} = (h-c)/2.$$

6. The method as claimed in claim 1, wherein the window has a height h and the characters have a height c, and the distance $d_{mini}$ is determined in accordance with the following relationship:

$$d_{mini} = h - 2c$$

and the distance $d_{maxi}$ is determined in accordance with the following relationship:

$$d_{maxi} = (h-c)/2.$$

* * * * *